United States Patent
Sonehara et al.

(10) Patent No.: US 6,776,364 B2
(45) Date of Patent: Aug. 17, 2004

(54) PROCESS FOR REUSING WASTE PAINT AND PROCESSOR THEREFOR

(75) Inventors: Kuniya Sonehara, Tokyo (JP); Takayuki Kawaguchi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 21 days.

(21) Appl. No.: 10/261,417

(22) Filed: Oct. 2, 2002

(65) Prior Publication Data

US 2003/0062431 A1 Apr. 3, 2003

(30) Foreign Application Priority Data

Oct. 2, 2001 (JP) .......................................... 2001-306249

(51) Int. Cl.[7] .............................................. B02C 19/12
(52) U.S. Cl. ........................................... 241/23; 241/65
(58) Field of Search .............................. 241/23, 65, 29, 241/152.2

(56) References Cited

U.S. PATENT DOCUMENTS

| 3,941,315 A | 3/1976 | Gribble et al. |
|---|---|---|
| 5,695,281 A | 12/1997 | Weber et al. |
| 6,311,906 B1 | 11/2001 | Kim |
| 2002/0038829 A1 | 4/2002 | Yamakawa et al. ........... 241/17 |

Primary Examiner—Mark Rosenbaum
(74) Attorney, Agent, or Firm—Smith, Gambrell & Russell, LLP

(57) ABSTRACT

The present invention provides a process and processor for reusing waste paint, rolling the waste paint between a pair of heated rotating drums 15 disposed opposite to each other in a rolling dryer 13 for dehydrating and drying the waste paint (rough drying step I), and accumulating the dehydrated and dried waste paint in a stirring dryer 21 while stirring the accumulated waste paint by a rotating grinding rotor 24 under cooling (holding step II), and drying and pulverizing the accumulated waste paint with the rotating grinding rotor 24 under heating (main drying step III). The process and processor bring about highly efficient processing of the waste paint.

6 Claims, 7 Drawing Sheets

PROCESS FOR REUSING WASTE PAINT AND PROCESSOR THEREFOR

BACKGROUND OF THE INVENTION

1. Field of the Invention

The present invention relates to a process and processor for reusing a waste paint discharged from processes such as coating process of applying paint to a vehicle body.

2. Description of the Related Art Including Information Disclosed Under 37 CFR 1.97 and 1.98

For instance, in a paint shop, a vehicle body is painted out by spraying coatings in a paint booth. In spraying coatings, there is some coating liquid which is not adsorbed onto the vehicle body due to spray missing (overspray). The missing spray coating enters into circulating water in a pit on the lower side of the booth, and is led to a settling (precipitation, deposit) tank together with the water. After some time period, soft cake-like masses settle and these are collected as waste paints. The waste paint is burnt up, or otherwise is dried and ground as a processed waste paint which is generally used for asphalt sheets and chipping resistant coatings.

However, the waste paint collected in the paint booth is not cured because it is not passed through a curing process. Therefore it is necessary to completely cure the waste paint to pulverize it for its reuse.

Examples of processors for drying and pulverizing the waste paint include a screw drying machine, a stirring drying machine and a rolling drying machine. Methods for processing the waste paint by using each of the drying machines are explained in order.

FIG. 5 is a schematic view for explaining a method for processing the waste paint by using the screw drying machine. In this process, the waste paint placed in a hopper 101 is introduced into a screw dryer 105 by a screw conveyor 102 and a belt conveyor 103, and dried in the screw dryer 105 to be pulverized, whereby the waste paint can be converted into resources.

The screw dryer 105 is provided with a cylindrical processing tank 106 into which the paint waste is introduced by the belt conveyor 103, a rotating grinding rotor 107 having plural grinding rotors 107b mounted on a rotating axis 107a which is horizontally extended in a processing tank 106, and a screw conveyor 108 disposed on the lower side of the processing tank 106.

When the waste paint is introduced into the processing tank 106, the grinding of the waste paint is started by rotation of the rotating grinding rotor 107, and simultaneously its heating is started by steam. In the process of heating of the waste paint, the waste paint is melted to form a large mass having high viscosity (e.g., heated rice cakes). In this condition, the heating promotes the vaporization of a solvent in the waste paint to dry out the waste paint.

When the waste paint is heated, the curing of a resin component in the waste paint is proceeded, and as a result the cured waste paint is ground with the rotating grinding rotor 107. The ground waste paint (i.e., resin powder) is fed as resources from the lower side of the processing tank 106 by the screw conveyor 108.

On the other hand, the water and solvent contained in the waste paint are vaporized in the processing tank 106, and the vaporized water and solvent are liquefied or condensed by a heat exchanger 109 to be discharged as condensed liquid. In this case, hydrocarbon is removed and only nontoxic gas is discharged. A reference number 109a is a vacuum pump for reducing pressure in the heat exchanger 109.

FIG. 6 is a schematic view for explaining a method for processing the waste paint by using the stirring and drying machine. The waste paint placed in a hopper 101 is introduced into the stirring dryer 115 by a screw conveyor 102 and a belt conveyor 103, and dried in the stirring dryer 115 to be pulverized, whereby the waste paint is converted into resources.

The stirring dryer 115 is provided with a cylindrical processing tank 116 having a bottom into which the paint waste is introduced, a rotating grinding rotor (grinder) 117 with grinding rotors 117b mounted on a rotating axis 117a which is perpendicularly extended in the processing tank 116, and an outlet 118 disposed on the lower side of the processing tank 116.

When the waste paint is introduced into the processing tank 116, grinding of the waste paint is started by rotation of the rotating and grinding rotor 117, and simultaneously its heating is started by the steam. In the course of heating the waste paint, the waste paint is melted to form large masses having high viscosity (e.g., heated rice cakes). In this condition, the heating promotes the vaporization of a solvent in the waste paint to dry out the waste paint.

When the waste paint is heated, the curing of a resin component in the waste paint is proceeded, and as a result the cured waste paint is ground by the grinding rotor 117. The ground waste paint (i.e., resin powder) is fed as resources from the outlet 118 provided on the lower of the processing tank 116.

Water and solvent contained in the waste paint are vaporized in the processing tank 116, and the vaporized water and solvent are liquefied or condensed by a heat exchanger 109 to form condensed liquid, and hydrocarbon is removed to discharge only nontoxic gas into atmosphere.

FIG. 7 is a schematic view for explaining a method for processing the waste paint waste by using the rolling drying machine. The waste paint placed in a hopper 101 is introduced into the rolling dryer 121 by a screw conveyor 102 and a belt conveyor 103, and similarly dried in the rolling dryer 121 to be pulverized, whereby the waste paint is converted into resources.

The rolling dryer 121 is provided with a box-shaped processing tank 122 into which the waste paint is introduced, a pair of rotating drums 123 which are horizontally disposed opposite to each other in the processing tank 122 and which rotate in the opposite direction each other, a scraper blade 124 whose edge is contact with the surface of each of the drums 123, and a screw conveyor 125 disposed on the lower side of the processing tank 122.

A large mass of waste paint, which is introduced from the upper side of a processing tank 122, is fed between a pair of rotating drums 123 opposite to each other, rolled therebetween under heating, whereby drying and grinding are started. The rolled and dried waste paint is adhered in the form of sheet onto the surface of the rotating drums 123 to be moved by rotation of the drums, and scratched up by the scraper blade 124. The scratched waste paint is fallen from the drums 123 and fed as resources from the lower side of the processing tank 121 by the screw conveyor 125.

Water and solvent contained in the waste paint are vaporized in the processing tank 121, and the vaporized water and solvent are liquefied or condensed by a heat exchanger 109 in the same manner as the screw drying machine 100, and hydrocarbon is removed to discharge only the nontoxic gas into the atmosphere.

SUMMARY OF THE INVENTION

According to a method for processing the waste paint using the screw drying machine shown in FIG. 5, the collected waste paint is stirred under heating with the rotating grinding rotor 107 within the processing tank 106 and therefore it is gradually cured. In the beginning stage of the curing, the waste paint is increased in viscosity to become high viscous (such as in the condition of heated rice cake), and therefore resistance to rotating of the rotating grinding rotor 107 is increased and subsequently power for driving the rotor (e.g., consumed power of electric motor) is also increasingly required. For the reason, it is required to switch the rotation number (speed) of the rotating grinding rotor 107 to a low rate and much time is taken for reduction of water content of the waste paint.

Also in the method for processing the waste paint using the stirring and drying machine shown in FIG. 6, the collected waste paint is stirred under heating with the rotating grinding rotor 117 within the processing tank 116 and therefore it is gradually cured. In the beginning stage of the curing, the waste paint is increased in viscosity to become high viscous (such as in the condition of heated rice cake), and therefore the resistance to rotation of the rotating grinding rotor 117 is increased and subsequently the power for driving the rotor (e.g., consumed power of electric motor) is also increasingly required. For the reason, it is required to switch the speed of the rotating grinding rotor 117 to a low rate and much time is taken for reduction of the water content of the waste paint. Further, it is particularly difficult to conduct continuously the steps of from a step of introduction of the waste paint into the processing tank 116 to a step for drying thereof, and therefore a working step for reserving the waste paint is required to reduce the working efficiency.

According to a method for processing the waste paint using a rolling and drying machine shown in FIG. 7, the collected waste paint is rolled and heated between a pair of rotating drums 123 opposite to each other to be dried. However, much time is taken for obtaining waste paint having low water content suitable for resources by the rolling and dehydrating/drying by the use of the rotating drums 123 and therefore it is difficult to successfully perform the method.

The method for processing waste paint using the screw, stirring or rolling drying machine requires much time and cost for processing the waste paint. Hence, a method for processing efficiently the waste paint is desired As a result of many experiments, it was found that, in the drying stage of the waste paint by the stirring dryer, there are some relationships among variations of characteristics of the waste paint, variation of stirring power, variation of temperature of the waste paint and variation of the water content.

The experiment was carried out as follows: 8 kg of the waste paint having 30% by weight of water content was dried using a stirring dryer of volume of 20 L under the conditions of steam pressure of 5 kg/cm$^3$. As a result, the drying characteristics of the waste paint are shown in FIG. 8.

The drying characteristics of the waste paint of FIG. 8 indicate the followings: In the beginning stage of the curing of the waste paint by rotating the grinding rotor and by drying by heat, value of electric current for driving the rotor is rapidly increased due to high viscosity of the waste paint, and simultaneously the content of water in the waste paint is drastically reduced whereby the waste paint is made in critical state to be destroyed. As a result, the current value is suddenly lowered because of reduction of load of the electric motor, and then the current value is approximately kept in constant while the water content is gradually reduced. Hence, it is understood that the beginning stage of the curing using the waste paint having relative high content of the water requires high power.

On the other hand, the rolling dryer rolls the waste paint between a pair of rotating drums and therefore it is difficult to sufficiently reduce the content of water after the processing by rolling. However, it has been confirmed by the experiments that the continuous rolling of the waste paint enables efficient drying (dehydration) in the beginning stage in a short time by a relative low power.

In view of the above-mentioned drying characteristics of the stirring dryer and rolling dryer, an object of the invention is to provide a process and processor for reusing waste paint (i.e., a process and processor for converting waste paint into resources) which bring about highly efficient processing of the waste paint.

The present invention to attain the object is provided by a process for reusing a waste paint comprising:

rolling the waste paint between a pair of heated rotating drums disposed opposite to each other for dehydrating and drying the waste paint (a rough drying step), accumulating successively the dehydrated and dried waste paint in a processing tank with the accumulated waste paint being stirred with a rotating grinding rotor in the processing tank under cooling (a holding step), and drying and pulverizing the accumulated waste paint with the rotating grinding rotor under heating (a main drying step).

According to the above-mentioned invention (corresponding to claim 1), the rough drying step includes heating and dehydrating/drying waste paint having relative high content of water by rolling it between a pair of heated rotating drums. In the rough drying by the use of the rotating drums, power for dehydrating and drying the waste paint is extremely low, and further the characteristics of thermoset resin of the waste paint are destroyed. The waste paint dried in the rough drying step is cooled in the holding step, and stirred with the rotating grinding rotor to be successively accumulated in the state free from fusing and aggregation each other.

In the main drying step, the waste paint accumulated in the holding step is dried and pulverized with the rotating grinding rotor in the processing tank to provide resources. The waste paint in the main drying step can be easily and efficiently pulverized with the rotating grinding rotor in less power because the characteristics of thermoset resin of the waste paint in the rough drying step is destroyed and the waste paint is accumulated successively in the state free from fusing and aggregation each other.

Thus, it is possible that the above-mentioned process for reusing a waste paint provides pulverized waste paint suitable for resources from waste paint in extremely reduced energy, and converts easily and efficiently the waste paint into resource.

Another invention to attain the object is provided by a processor for reusing a waste paint comprising:

a rolling dryer comprising a pair of heatable rotating drums disposed opposite to each other for rolling the waste paint introduced therebetween to dehydrate and dry the waste paint, a stirring dryer for holding the waste paint comprising a processing tank configured for cooling and successively accumulating the dehydrated and dried waste paint therein and a rotating grinding rotor for stirring the accumulated waste paint in the processing tank under cooling, and a stirring dryer for main drying comprising a heatable processing tank for heating the accumulated waste paint and a rotating grinding rotor therein for pulverizing and drying the accumulated waste paint under heating.

According to the above-mentioned invention (corresponding to claim 2), the processor comprising the rolling dryer that heats and dehydrates/dries waste paint having relative high content of water by rolling it between a pair of heated rotating drums and further destroys the characteristics of thermoset resin of the waste paint; a stirring dryer for holding that stirs the roughly dried waste paint under cooling to accumulate it in the state free from fusing and aggregation each other; and the stirring dryer for main drying that pulverizes and dries the accumulated waste paint with the rotating grinding rotor under heating to provide resources, permits the above-mentioned process for reusing a waste paint (claim 1) to advantageously perform.

The further invention to attain the object is provided by a processor for reusing a waste paint comprising:

a rolling dryer comprising a pair of heatable rotating drums disposed opposite to each other for rolling the waste paint introduced therebetween to dehydrate and dry the waste paint, and a stirring dryer comprising a processing tank capable of regulating temperature provided with temperature-regulating means and a rotating grinding rotor for successively accumulating the dehydrated and dried waste paint therein, for stirring the accumulated waste paint by a rotating grinding rotor under cooling by the temperature-regulating means, and for pulverizing and drying the accumulated waste under heating by the temperature-regulating means.

According to the above-mentioned invention (corresponding to claim 3), the processor comprising the rolling dryer that heats and dehydrates/dries waste paint having relative high content of water by rolling it between a pair of heated rotating drums; a stirring dryer that stirs the roughly dried waste paint under cooling to accumulate it in the state free from fusing and aggregation each other (a holding step) and that pulverizes and dries the accumulated waste paint with the rotating grinding rotor under heating to provide resources (a main drying step), permits the above mentioned process for reusing a waste paint (claim 1) to advantageously perform. Moreover, since only one stirring dryer performs both of the holding step and the main drying step, the processor for reusing a waste paint can be simplified and compactified compared with the processor described in another invention (claim 2).

The further invention to attain the object is provided by a processor for reusing a waste paint comprising:

a rolling dryer comprising a pair of heatable rotating drums disposed opposite to each other for rolling the waste paint introduced therebetween to dehydrate and dry the waste paint, plural stirring dryers comprising a processing tank capable of regulating temperature provided with temperature-regulating means and a rotating grinding rotor for successively accumulating the dehydrated and dried waste paint therein, for stirring the accumulated waste paint by a rotating grinding rotor under cooling by the temperature-regulating means, and for pulverizing and drying the accumulated waste under heating by the temperature-regulating means, and conveyor means comprising a conveyor rout and means for changing the conveyor rout disposed between the rolling dryer and each of the stirring dryers, the waste paint dried in the rolling dryer being fed to each of the stirring dryers by changing the conveyor rout (by the means for changing the conveyor rout), wherein the means for changing the conveyor rout is switched such that at least one of the plural stirring dryers conducts a step comprising accumulating successively the dehydrated and dried waste paint and stirring the accumulated waste paint with a rotating grinding rotor under cooling, and the waste paint dried in the rolling dryer is fed to the stirring dryer to conduct the step.

According to the above-mentioned invention (corresponding to claim 4), the processor includes the rolling dryer, the plural stirring dryers for successively accumulating the dehydrated and dried waste paint and stirring the accumulated waste paint under cooling (a holding step), and for pulverizing and drying the accumulated waste under heating (a main drying step), and the conveyor means feeding the waste paint dried in the rolling dryer to each of the stirring dryers by changing the conveyor rout. In the processor, the waste paint dried in the rolling dryer is fed to the stirring dryer in order of precedence to conduct the above step, whereby the rolling dryer can be continuously operated to efficiently convert the waste paint to resources.

In the processor for reusing a waste paint (corresponding to claim 3 or 4), the temperature-regulating means has a jacket provided around the processing tank of the stirring dryer, and switching means for feeding one of cooling water and steam to the jacket.

According to the above-mentioned invention (corresponding to claim 5), the waste paint in the processing tank can be efficiently heated or cooled by feeding one of cooling water and steam to the jacket provided around the processing tank by switching.

DETAILED DESCRIPTION OF THE INVENTION

The embodiments of the process and processor for reusing waste paint according to the invention are explained with reference to Figures.

First Embodiment

Figure 1:
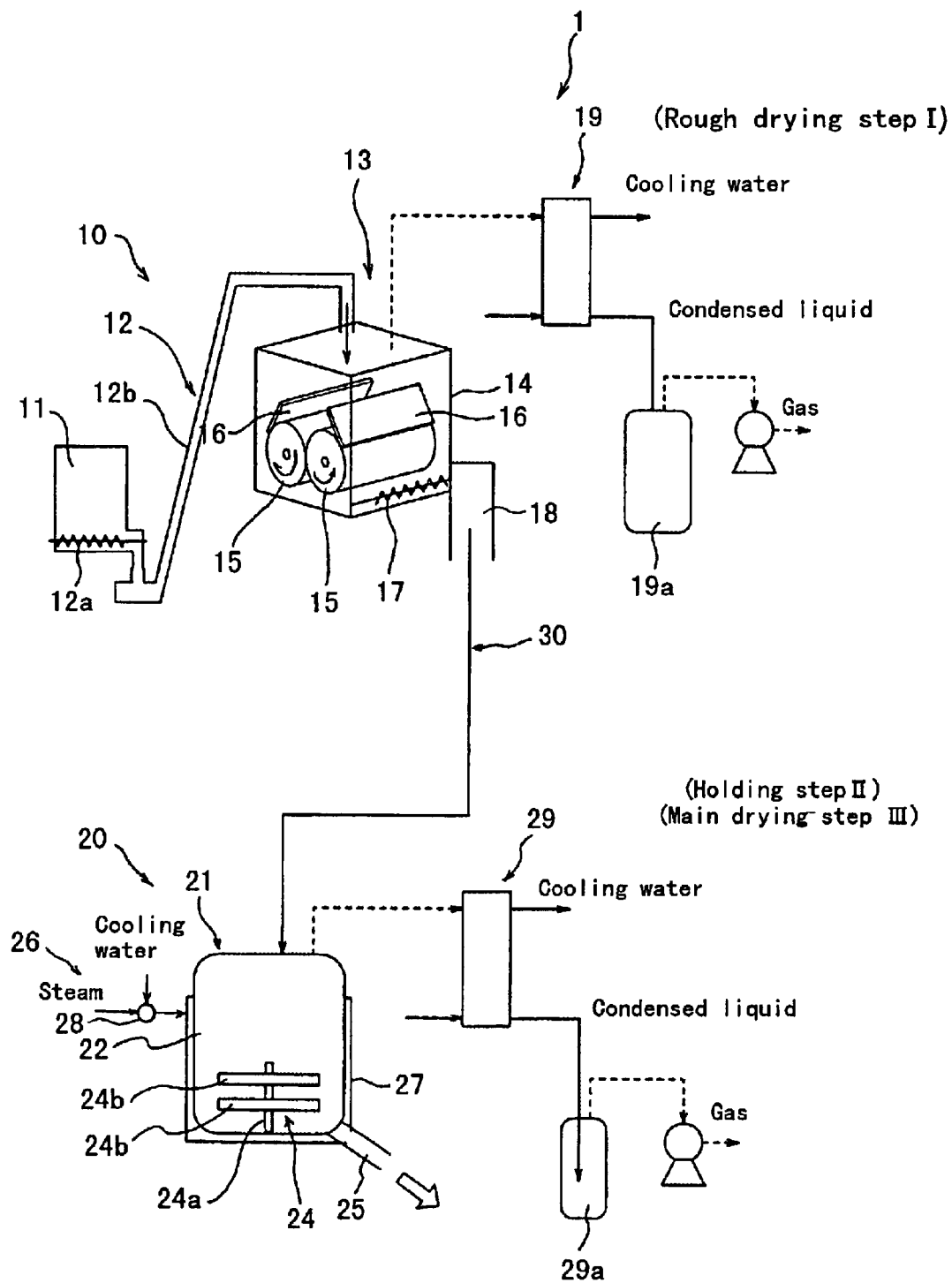
FIG. 1 is a schematic view for explaining a first embodiment of a process or processor for reusing waste paint according to the present invention.
Figure 2:
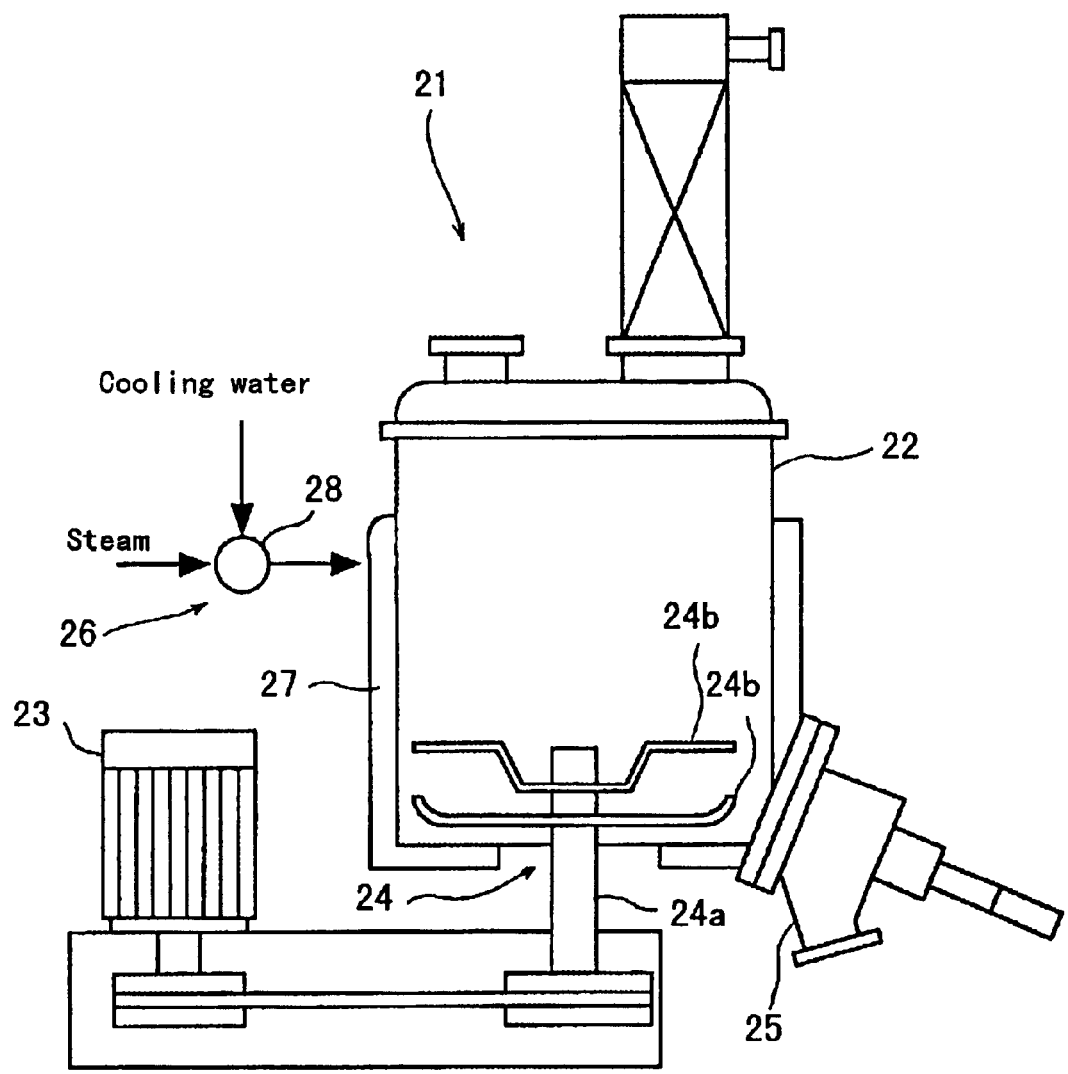
FIG. 2 is a schematic view for explaining the stirring dryer according to the invention.

The first embodiment of the invention is explained by referring to FIGS. 1 and 2. FIG. 1 is a schematic view for explaining the processor 1 for reusing waste paint according to the first embodiment, which is provided with a rough (preparatory) drying section 10, a main drying section 20 and conveyor means for conveying waste paint dried in the rough drying section 10 to the main drying section 20.

In the rough drying section 10, a waste paint collected from a tank such as settling tank is placed in a hopper 11, the placed waste paint is fed to a rolling dryer 13 by conveying equipments 12 such as a screw conveyor 12a and a belt conveyor 12b, and the waste paint roughly dried by the rolling dryer 13 is fed to a main drying section 20 by a conveying equipment 30, and then further dried and pulverized in the main drying section 20.

The rolling dryer 13 is provided with a box-shaped processing tank 14 into which the waste paint fed by the belt conveyor 12 is placed, a pair of rotating drums 15 horizontally disposed opposite to each other in gap (opening) of several mm or less, a scraper blade 16 in the form of plate which is arranged on each of the rotating drums 15 so as to extend in an axial direction of the drum and whose edge is in contact with an outer surface of the drum 15 throughout the whole width, a screw conveyor 17 provided on a lower side of a first processing tank 14, and an outlet 18. Steam is fed to the inside of each of the rotating drums 15 to heat the drums.

A first heat exchanger 19 is provided in the vicinity of the rolling dryer 13. Water and solvent vaporized in the first processing tank 14 are liquefied or condensed in the heat exchanger 19, and further hydrocarbons are removed to discharge only nontoxic gas in the heat exchanger 19. A vacuum pump 19a causes reduction of an internal pressure in the heat exchanger 19.

A main drying section 20 is provided with a stirring dryer 21 combining a stirring dryer for holding and a stirring dryer for main drying which mainly dries and pulverizes the waste paint conveyed by the conveying equipment 30.

The stirring dryer 21 is provided with a cylindrical processing tank 22 having a bottom into which the paint waste conveyed by the conveying equipment 30 is introduced from the rolling dryer 13, a rotating grinding rotor 24 having grinding rotors 24b mounted on a rotating axis 24a which is arranged to be perpendicularly extended in the processing tank 22 and rotated by a electric motor 23, and an outlet 25 disposed on the lower side of the processing tank 22, shown in FIG. 2.

The stirring dryer 21 is provided with temperature-regulating means 26 for heating or cooling the waste paint placed in the processing tank 22. The temperature-regulating means 26 has a jacket 27 provided around the processing tank 22, a changeover valve 28 as changeover means for feeding steam or cooling water from each supply source into the inside of the jacket 27 by changeover and a discharge valve (not shown) for discharging the cooling water or the like within the jacket 27.

A second heat exchanger 29 is provided in the vicinity of the stirring dryer 21. The water and solvent vaporized in the processing tank 22 are liquefied or condensed in the heat exchanger 29, and hydrocarbons are further removed to discharge only the nontoxic gas in the heat exchanger 29. A second vacuum pump 29a causes reduction of pressure in the heat exchanger 29.

Subsequently, the operation of the processor 1 for reusing the waste paint having an above structure is explained.

In the rough drying step I, the waste paint (e.g., the waste paint having water content of 50% by weight) collected in a setting tank and the like is introduced into the hopper 11 of the rough drying section 10, and further introduced into the processing tank 14 of the rolling dryer 13 from upper side by the conveying equipment 12. The waste paint introduced into the first processing tank 14 is passed between a pair of heated rotating drums 15 disposed opposite to each other to be rolled by a shear action given by the rotating drums 15, and consequently heated by the drums to be dehydrated and dried, whereby the water content of the waste paint attains to about 10% by weight. For the rough drying step, the rotating drums 15 are rotated at a constant rate, and therefore the power required for dehydrating and drying of the waste paint is extremely low.

The waste paint dehydrated and dried by rolling between the rotating drums 15 is adhered in the form of sheet or foil onto the surface of the rotating drums 15 by the rolling of the drums. Thereafter, the sheet or foil shaped waste paint is scratched up by the scraper blade 16 whose edge is in contact with the surface of the rotating drums 15 to be fallen onto a bottom of the first processing tank 14. The scratching up of the waste paint from the rotating drum 15 by the scraper blade 16 can be easily carried out because the thermoset characteristics of the waste paint is already destroyed by heating (drying). On the other hand, the waste paint fallen onto the bottom of the processing tank 14 is gradually fed into the conveying means 30 from the outlet 18 by the screw conveyor 17 according to the progress of the rough drying processing of the rolling dryer 13.

Moreover, water and solvent removed (e.g., dehydrated) from the waste paint is heated and vaporized in the processing tank 14, and liquefied or condensed in the first heat exchanger 19, and further the hydrocarbons are removed to discharge only the nontoxic gas to the atmosphere.

A prescribed amount of the waste paint roughly dried in the rough drying step I is held in the processing tank 22 in the holding step II in which the waste paint is introduced into the processing tank 22 of the stirring dryer 21 by the conveying means 30, and then dried and pulverized in the main drying step III.

In the holding step II, cooling water is fed into the inside of the jacket 27 through the changeover valve 28 of the temperature-regulating means 26, and simultaneously the rotating grinding rotor 24 is rotated at rather low speed by an electric motor 23, and the roughly dried waste paint is gradually introduced from the rolling dryer 11 into the processing tank 22 by the conveying means 30 with the outlet 25 being closed, until a prescribed amount of the waste paint is accumulated. After the operation of the rolling dryer 13 stops when the accumulated waste paint reaches the prescribed amount, the waste paint stops feeding into the processing tank 22.

The waste paint in the processing tank 22 is cooled by the cooling water fed into the jacket 27 and simultaneously stirred and pulverized with the rotating grinding rotor 24 during the holding step II introducing the waste paint into the processing tank 22 to accumulate the waste paint. This cooling and pulverizing bring about efficient prevention of fusing and aggregation each other.

Figure 8:
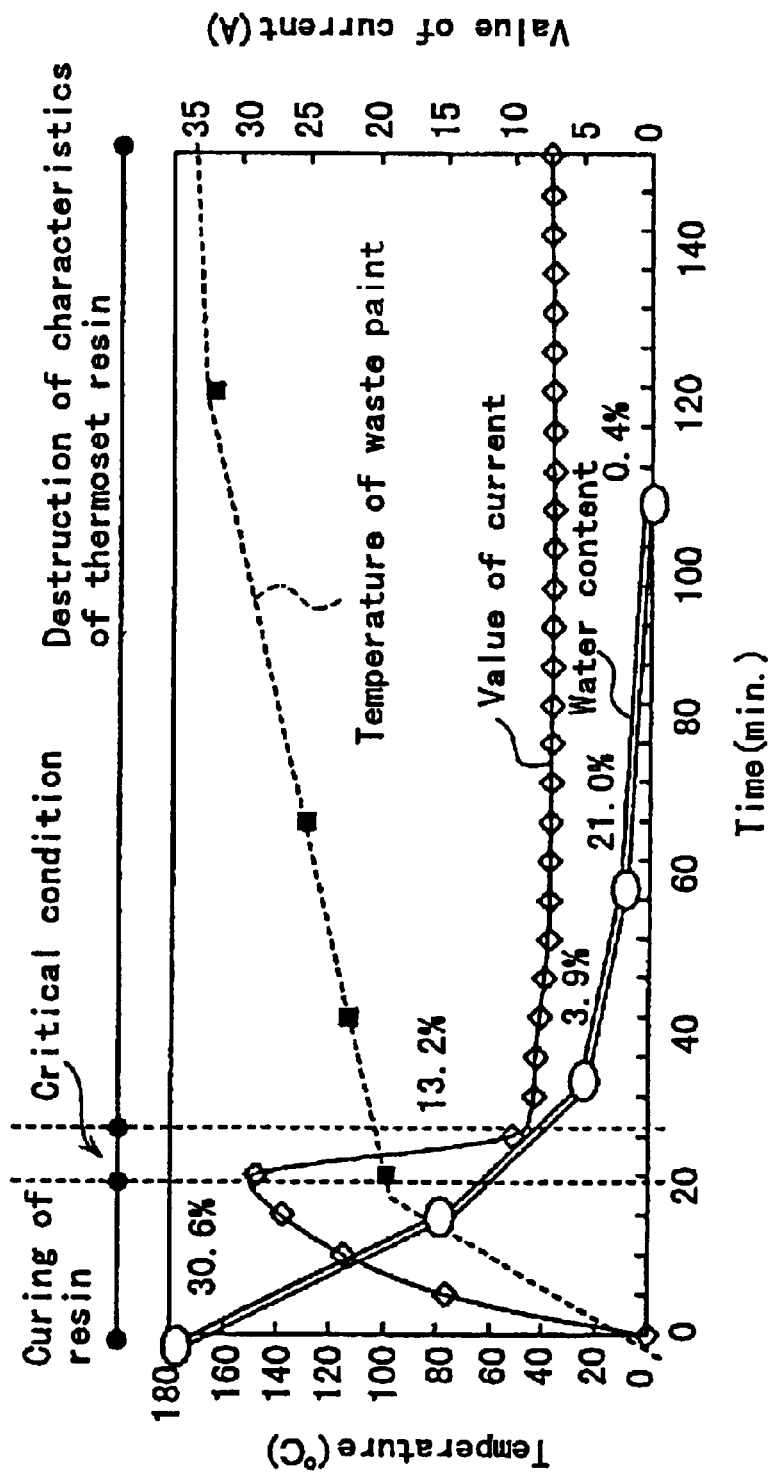
FIG. 8 is a view for explaining the drying characteristics of the waste paint in case of using a conventional stirring and drying machine.

If the waste paint roughly dried to have water content of 10 or more % by weight is introduced into the processing tank 22 without drying under cooling to be held for a time, the waste paint has sticky in the critical state shown in FIG. 8, and therefore fused or aggregated by remaining heat by heating in the rolling dryer 14 and heat by stirring. In contrast, as long as, for example, the waste paint has water content of less than 10% by weight, it is possible that the waste paint is introduced into the processing tank 22 without drying under cooling and held for a time without fusion or aggregation. However, in order to obtain such waste paint having the low water content, enormous processing time and power are required and therefore it is difficult in practice, in view of the processing cost and processing sufficiency, to obtain the waste paint having the low water content using the rolling fryer 13.

In the next main drying step III, the discharge valve is opened to discharge the cooling water in the jacket 27, the changeover valve 28 for the temperature-regulating means 26 is switched to feed steam instead of cooling water into the jacket 27 for heating and the rotating grinding rotor 24 is rotated at high speed by the electric motor 23. The roughly dried waste paint is further pulverized with the rotating grinding rotor 24 rotating at high speed in the processing tank 22, and simultaneously dried by heating. The pulverized and heat-dried waste paint, i.e., resin powder is taken out as resources from outlet 25 provided on the lower portion of the processing tank 22. In this main drying step III, the waste paint in the main drying step can be easily pulverized with the rotating grinding rotor in less power because the characteristics of thermoset resin of the waste paint in the rough drying step I is destroyed and the waste paint is prevented from fusing and aggregation each other in the holding step II. Thus, the waste provides can be pulverized in extremely reduced energy and reduced time period to be converted to waste paint suitable for resource.

Moreover, water and solvent contained in the waste paint are heated and vaporized in the processing tank 22, and liquefied or condensed in the second heat exchanger 29, and further the hydrocarbons are removed to discharge only the nontoxic gas to the atmosphere.

After the main drying in the main drying step III is completed, the rough drying by the rolling dryer 13 is started again, and the roughly drying step I, the holding step II and the main drying step III are repeatedly conducted in order in the same manner as described above, whereby waste paint for resource is continuously collected.

EXAMPLE

In the above roughly drying step, the gap of the rotating drums 15 of the rolling dryer 13 was 0.25 mm, the temperature of the surface of each of the drums 15 was 150° C., and the rotation rate of each of the drums 15 was 3 rpm, and the area for heat transfer of the surface was 1.2 m$^2$. Into the rolling dryer 13 as defined above, the waste paint having water content of 50% by weight was introduced, and dehydrated and dried. The waste paint was processed for 80 minutes. The resultant waste paint had water content of 7.7% by weight and its weight was 49 kg. The maximum of electric power in this procedure was 1 kW.

In the next holding step II, cooling water was fed into the jacket 27 of the stirring dryer 21, and the waste paint was ground under cooing at wind speed of 5 to 7 m/s. The maximum power required for the grinding under cooling above was 8 kw, and after the grinding it lowered to 3 kw. Though the temperature of the waste paint rose due to the stirred heat during the grinding under cooling, the waste paint was cooled by cooling water in the jacket 27. Therefore the temperature is kept at about 25° C., and hence the grinding could be conducted in a little electric power. In this case, there was no variation of water content, but no waste paint was adhered onto the wall surface of the processing tank 22, whereby it was confirmed that the roughly dried waste paint was efficiently prevented from being aggregated and fused.

Thereafter cooling water was changed into the steam in the main drying step III. The waste paint was pulverized and dried under heating for 70 minutes to provide powder of waste paint having water content of 0.95% by weight. The maximum of electric power of the rotating grinding rotor 24 in this procedure was 8 kW.

Comparison Example

Into the stirring dryer 21 having the area for heat transfer of 1.2 m$^2$ as the rough dryer, 60 kg of the waste paint having water content of 50% by weight was introduced, and dehydrated and dried. The waste paint was processed for 80 minutes. The resultant waste paint had water content of 6.2% by weight. The maximum of power in this procedure was 19.4 kW.

Thus, in the rough drying, the electric power of the stirring dryer requiring for the almost same condition as Example was 19.4 kW while the electric power of the rolling dryer of Example was 1 kW. Therefore the electric power of the rolling dryer was only 5.2% of the electric power of stirring dryer to show extreme reduction of the electric power.

Further, the roughly dried waste paint was directly introduced into the stirred dryer 21 to form the aggregated waste paint, which was dried and pulverized. In this case, the maximum of power of 15 kW or more was needed.

Hence, the waste paint having water content of almost zero that is suitable for resources and renders the reuse of the waste paint easy and efficient can be obtained by the process of the invention which comprises the roughly drying step I using the rolling dryer, the holding step II using the stirring dryer for cooling and grinding to prevent aggregation and fusion, and the main drying step III using the stirring dryer.

In the above embodiment, the same stirring dryer 21 was used both in the holding step II and the main drying step III. However, from the viewpoints of processing capacity, two stirring dryers may be used in the holding step II and the main drying step III, respectively.

Second Embodiment

Figure 3:
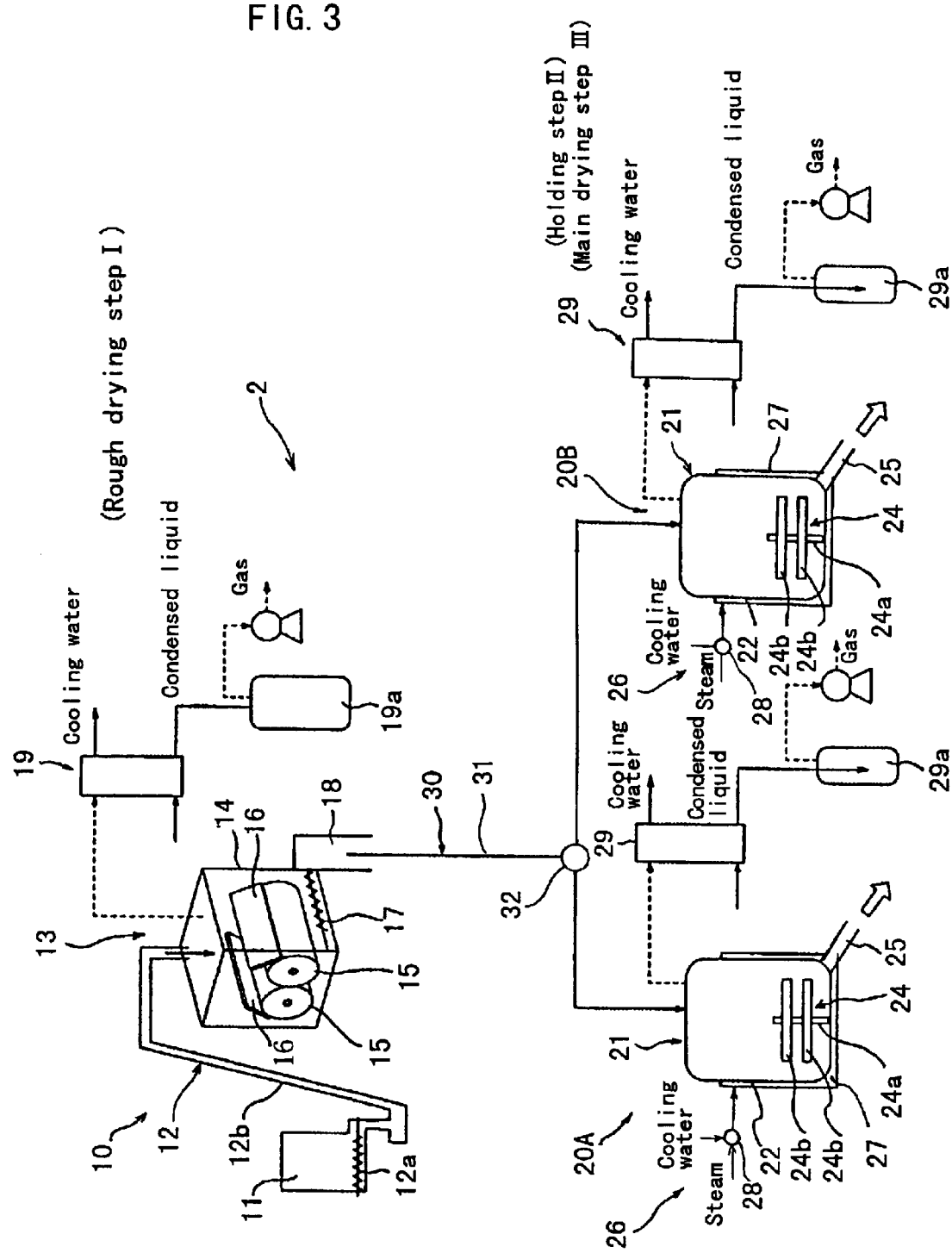
FIG. 3 is a schematic view for explaining a second embodiment of the process or processor for reusing waste paint according to the invention.
Figure 4:
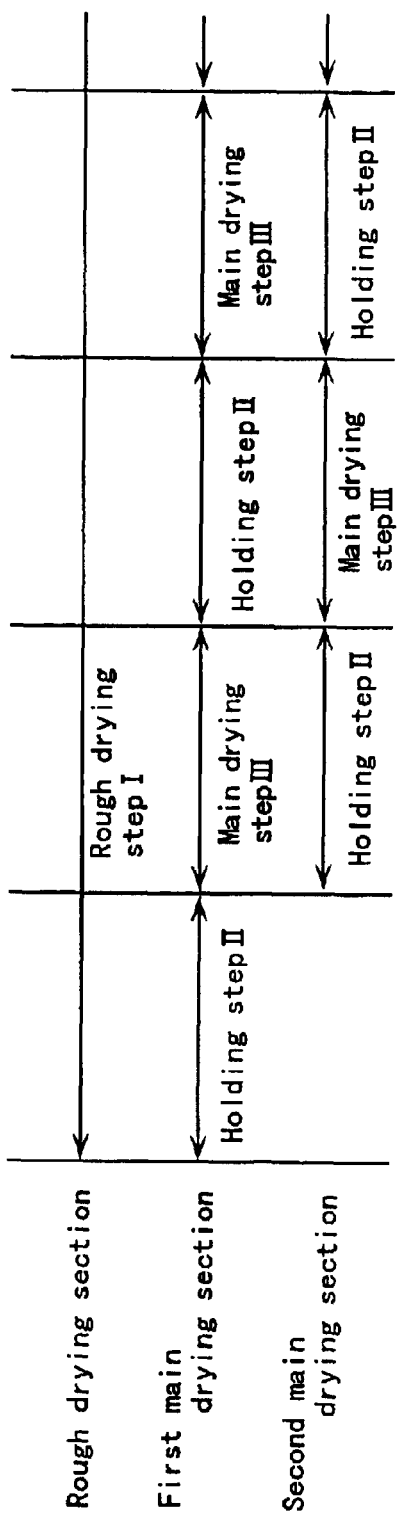
FIG. 4 is a schematic view for explaining the operations of a first drying section and a second drying section according to the invention.
Figure 5:
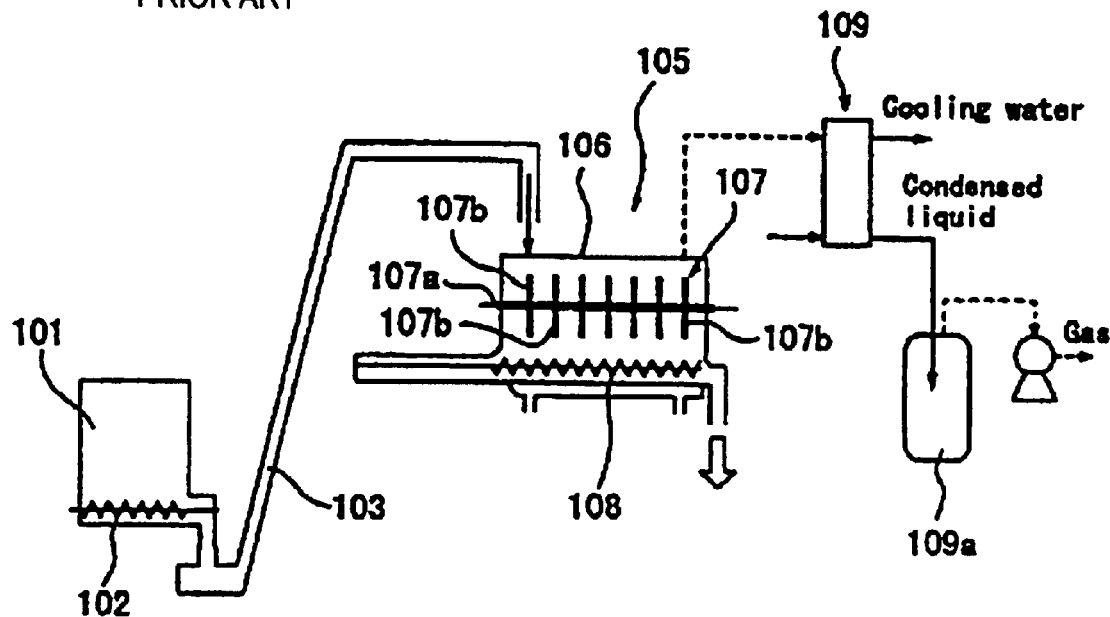
FIG. 5 is a schematic view for explaining the process for reusing waste paint using a conventional screw drying machine.
Figure 6:
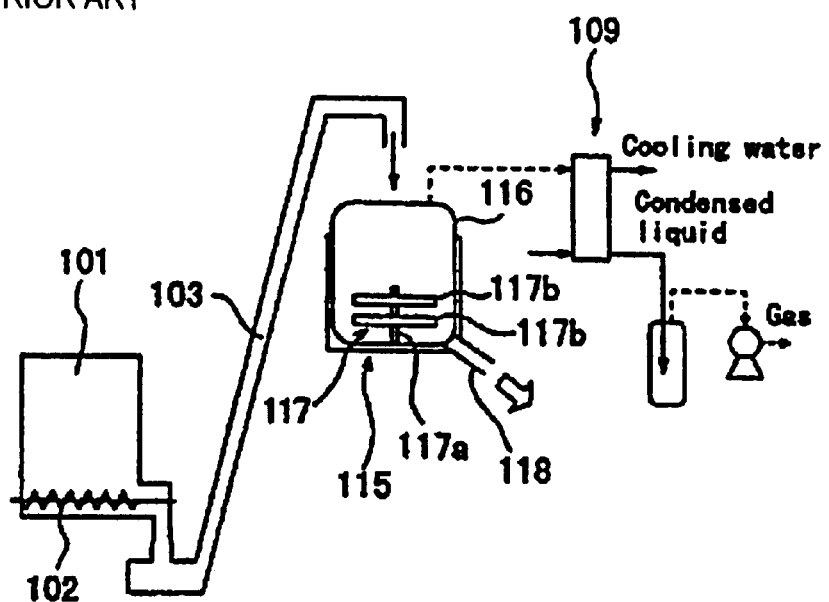
FIG. 6 is a schematic view for explaining the process for reusing waste paint using a conventional stirring drying machine.
Figure 7:
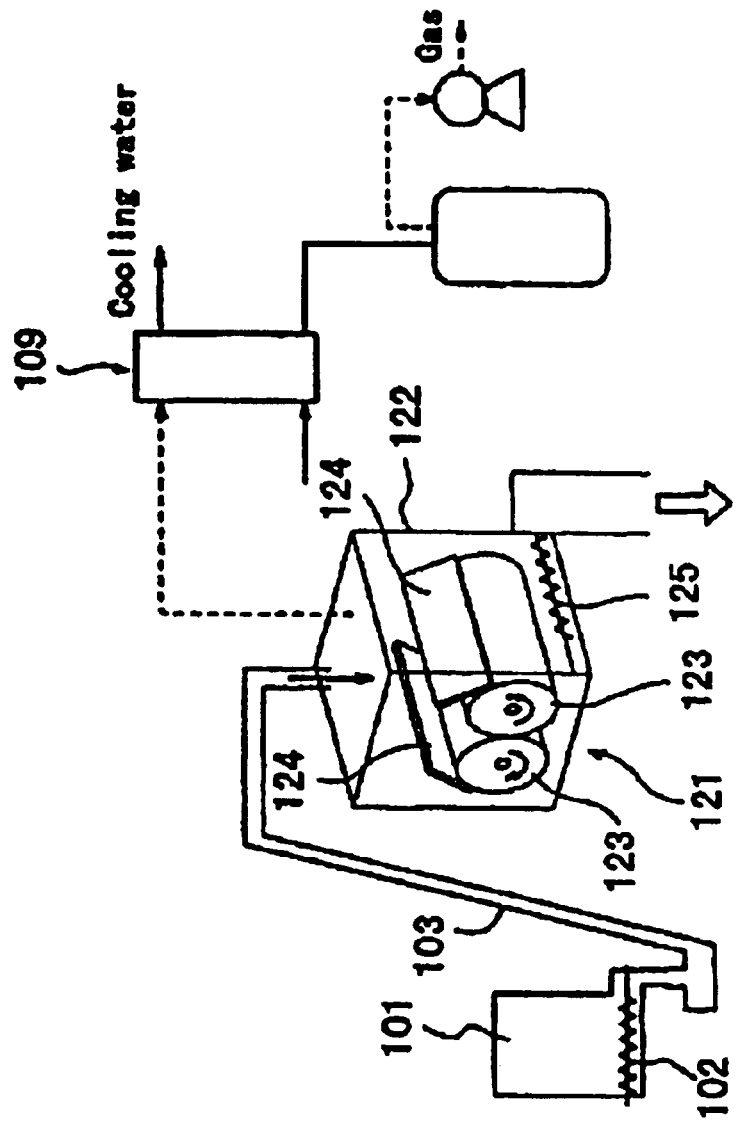
FIG. 7 is a schematic view for explaining the process for reusing waste paint using a conventional rolling drying machine.

The second embodiment of the invention is explained by referring to FIGS. 3 and 4. FIG. 3 is a schematic view for explaining the processor 2 for reusing waste paint according to the second embodiment, which is provided with a rough (preparatory) drying section 10, plural main drying sections 20, i.e., a first and second main drying sections 20A, 20B and conveyor means 30 for conveying waste paint dried in the rough drying section 10 to the first or second main drying section 20A, 20B by changeover.

The explanations as to components in FIGS. 3 and 4 corresponding to those in FIG. 1 are omitted by marking the same reference number as FIG. 1, because the rough drying section 10 and the first or second main drying section 20A, 20B have the same structure as the rough drying section 10 and the main drying section 20 of the first embodiment.

The conveying means 30 has a conveyor rout 31 disposed between the outlet 18 formed on the rolling dryer 13 of the rough drying section 10 and the processing tank 22 of each of the stirring dryers 21, and means 32 for changing conveyor rout provided on the conveyor rout 31. In the conveying means 30, waste paint discharged from the outlet 18 of the rolling dryer 13 is fed to the first or second main drying section 20A, 20B by changeover of the means 32 for changing conveyor rout.

Subsequently, the operation of the processor 2 for reusing the waste paint having an above structure is explained.

In the rough drying step I, the waste paint introduced into the processing tank 14 of the rolling tank 13 from the hopper 11 of the rough drying section 10 by the conveying equipment 12 is rolled between a pair of heated rotating drums 15 disposed opposite to each other under heating to be roughly dried. The waste paint roughly dried is gradually fed into the conveying means 30 from the outlet 18 according to the progress of the rough drying processing of the rolling dryer 13.

The waste paint fed into the conveying means 30 is introduced in order into the main drying section, for example the processing tank 22 of the first main drying section 20A, which is maintained in the condition of the holding step II according to changeover of the means 32 for changing conveyor rout disposed on the conveyor rout 31. The stirring dryer 21 of the main drying section 20A is cooled by cooling water fed from a temperature-regulating means 26 to the inside of the jacket 27 and simultaneously the waste paint is pulverized by the rotation at rather low speed of the rotating grinding rotor 24 to gradually be held until the pulverized waste paint is accumulated to the prescribed amount in the processing tank 22. The waste paint introduced into the processing tank 22 is effectively prevented from aggregating and fusing by grinding under cooling.

When the prescribed amount of waste paint is accumulated in the processing tank 22 of the first main drying section 20A, the means 32 for changing conveyor rout is changed whereby the introduction of the waste paint into the first main drying section 20A is stopped and simultaneously the introduction of the waste paint into the second main drying section 20B is started.

The first main drying section 20A is changed from the holding step II to the main drying step III by interlocking with the changeover of the means 32 for changing conveyor rout. Thereafter the cooling water in the jacket 27 is discharged, and steam is fed to the inside of the jacket 27 instead of the cooling water by the temperature-regulating means 26 to heat the jacket and simultaneously the rotating grinding rotor 24 is rotated at a high speed. The waste paint in the processing tank 22 is ground and pulverized with the rotating grinding rotor 24 rotating at a high speed and simultaneously dried under heating to discharge the pulverized waste paint (i.e., resin powder) as resources from the outlet 25 provided on the lower side of the processing tank 22.

On the other hand, the second main drying section 20B is changed to the holding step II by interlocking with the changeover of the means 32 for changing conveyor rout. Thereafter the stirring dryer 21 is cooled by the cooling water fed into the jacket 27 from the temperature-regulating means 26 and simultaneously the waste paint in the processing tank 22 is pulverized with the rotating grinding rotor 24 rotating at a rather low speed to be gradually held until the prescribed amount is reached in the processing tank 22.

Again, when the prescribed amount of waste paint is accumulated in the processing tank 22 of the second main drying section 20B, the means 32 for changing conveyor rout is changed whereby the introduction of the waste paint into the second main drying section 20B is stopped and the second main drying section 20B is switched to the main drying step III to start the main drying. On the other hand, the first main drying section 20A is switched to the holding step II to start grinding under cooling and holding.

In more detail, the first main drying section 20A and the second main drying section 20B are controlled by alternant changeover as shown in FIG. 4, and therefore one of the first main drying section 20A and the second main drying section 20B alternatively conducts the holding step II to consequently conducts continually the holding step II, whereby the waste paint roughly dried in the rough drying section I can be continuously fed to the first main drying section 20A or the second main drying section 20B. Hence, the roughly drying step I can be continuously carried out and therefore enables working efficiency and working ratio to enhance compared with the first embodiment.

Three or more main drying sections can be provided according to the processing capacity without restricting the first and second main drying sections 20A and 20B. Further at least one of plural stirring dryers continually conducts the holding step II by changing each of the stirring dryers to the holding step II from the main drying step III in order by changeover, and simultaneously the waste paint from the rolling dryer 14 can be fed to the stirring dryer in order by the conveying means 30 to continuously conduct the holding step II.

The present invention should not be restricted by the above-mentioned embodiments. Further the invention can be varied in the constitution so long as the variation is not deviated form the gist of the invention. For example, for components such as the heat exchanger disposed on the rough drying section and the main drying section, a single component such as the heat exchanger can be shared in these steps, whereby the processor can be simplified and compactified.

(Effect of the Invention)

According to the process for reusing the waste paint of the present invention, the rough drying step includes heating and dehydrating/drying waste paint having relative high content of water by rolling it between a pair of the heated rotating drums and brings about destruction of the characteristics of the thermoset resin of the waste paint, and the holding step includes stirring the waste paint roughly dried in the roughly drying step with the rotating grinding rotor under cooling to accumulate successively the waste paint free from aggregation and fusion each other, and the main drying step includes pulverizing and drying the waste paint accumulated in the holding step with the rotating grinding rotor in the processing tank to provide resources, whereby the pulverized waste paint suitable for resources from waste paint can be efficiently obtained in extremely reduced energy and in a short time period.

According to the processor for reusing the waste paint of the present invention, the processor includes the rolling dryer that heats and dehydrates/dries waste paint having relative high content of water by rolling it between a pair of heated rotating drums and further destroys the characteristics of thermoset resin of the waste paint, and a stirring dryer for holding that stirs the roughly dried waste paint under cooling to accumulate it in the state free from fusing and aggregation each other, and the stirring dryer for main drying that pulverizes and dries the accumulated waste paint with the rotating grinding rotor under heating to provide resources, permits the above mentioned process for reusing a waste paint to advantageously perform.

The disclosure of Japanese Patent Application No. 2001-306249, dated Oct. 2, 2001, including the specification, drawings and abstract, is hereby incorporated by reference in its entirety.

We claim:

1. A process for recycling a waste paint comprising:
   rolling the waste paint between a pair of heated rotating drums disposed opposite to each other for dehydrating and drying the waste paint, accumulating successively the dehydrated and dried waste paint in a processing tank with the accumulated waste paint being stirred with a rotating grinding rotor in the processing tank under cooling, and drying and pulverizing the accumulated waste paint with the rotating grinding rotor under heating.

2. A processor for recycling a waste paint comprising:

a rolling dryer comprising a pair of heatable rotating drums disposed opposite to each other for rolling the waste paint introduced therebetween to dehydrate and dry it, a stirring dryer comprising a processing tank capable of cooling for successively accumulating the dehydrated and dried waste paint therein and a rotating grinding rotor for stirring the accumulated waste paint in the processing tank under cooling, and a stirring dryer for main drying comprising a heatable processing tank for heating the accumulated waste paint and rotating grinding rotor therein for pulverizing and drying the accumulated waste paint under heating.

3. A processor for recycling a waste paint comprising:

a rolling dryer comprising a pair of heatable rotating drums disposed opposite to each other for rolling the waste paint introduced therebetween to dehydrate and dry it, and a stirring dryer comprising a processing tank capable of regulating temperature provided with temperature-regulating means and a rotating grinding rotor for successively accumulating the dehydrated and dried waste paint therein, for stirring the accumulated waste paint with the rotating grinding rotor under cooling by the temperature-regulating means, and for pulverizing and drying the accumulated waste under heating by the temperature-regulating means.

4. A processor for recycling the waste paint as defined in claim 3, wherein the temperature-regulating means has a jacket provided around the processing tank of the stirring dryer and switching means for feeding any of cooling water and steam to the jacket.

5. A processor for recycling a waste paint comprising:

a rolling dryer comprising a pair of heatable rotating drums disposed opposite to each other for rolling the waste paint introduced therebetween to dehydrate and dry it, plural stirring dryers comprising a processing tank capable of regulating temperature provided with temperature-regulating means and a rotating grinding rotor for successively accumulating the dehydrated and dried waste paint therein, for stirring the accumulated waste paint with the rotating grinding rotor under cooling by the temperature-regulating means, and for pulverizing and drying the accumulated waste under heating by the temperature-regulating means, and conveyor means comprising a conveyor rout and means for changing the conveyor rout disposed between the rolling dryer and the stirring dryers, the waste paint dried in the rolling dryer being fed to each of the stirring dryers by changing the conveyor rout by the means for changing the conveyor rout, wherein the means for changing the conveyor rout is switched such that at least one of the plural stirring dryers conducts a step comprising accumulating successively the dehydrated and dried waste paint and stirring the accumulated waste paint by a rotating grinding rotor under cooling, in order to continually conduct the step, and such that the waste paint dried in the rolling dryer is fed to the stirring dryer to conduct the above step.

6. A processor for recycling the waste paint as defined in claim 5, wherein the temperature-regulating means has a jacket provided around the processing tank of the stirring dryer and switching means for feeding any of cooling water and steam to the jacket.

* * * * *